US009201145B2

(12) United States Patent
Ellison-Marion et al.

(10) Patent No.: US 9,201,145 B2
(45) Date of Patent: Dec. 1, 2015

(54) OBJECT LOCATION IN THREE DIMENSIONAL SPACE USING LED LIGHTS

(71) Applicant: International Business Machines Corporation, Armonk, NY (US)

(72) Inventors: Nadine Ellison-Marion, West Henrietta, NY (US); Mark A. Nelson, Poughkeepsie, NY (US); Kevin H. Peters, Germantown, NY (US); Louis R. Ruggiero, Sandy Hook, CT (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 14/056,169

(22) Filed: Oct. 17, 2013

(65) Prior Publication Data

US 2015/0109609 A1    Apr. 23, 2015

(51) Int. Cl.
*G01B 11/14* (2006.01)
*G01S 17/48* (2006.01)
*G01S 17/58* (2006.01)

(52) U.S. Cl.
CPC .......... *G01S 17/48* (2013.01); *G01S 17/58* (2013.01)

(58) Field of Classification Search
USPC ................. 356/614–623; 348/222.1, 208.14, 348/94–95, 148–149, 113–120, 135–142; 382/106; 340/988–996
See application file for complete search history.

(56) References Cited

U.S. PATENT DOCUMENTS

| 5,814,808 | A | 9/1998 | Takada et al. |
|---|---|---|---|
| 6,549,288 | B1 | 4/2003 | Migdal et al. |
| 6,549,289 | B1 | 4/2003 | Ellis |
| 7,538,813 | B2 | 5/2009 | Wernersson |
| 7,616,327 | B2 | 11/2009 | Michelin |
| 7,859,398 | B2 | 12/2010 | Davidson et al. |
| 8,213,801 | B2 | 7/2012 | Nien et al. |
| 2003/0045816 | A1 | 3/2003 | Foxlin |
| 2009/0033757 | A1 | 2/2009 | Shimada |
| 2009/0284366 | A1 | 11/2009 | Haartsen et al. |
| 2010/0251804 | A1 * | 10/2010 | Morley et al. ................. 73/23.3 |
| 2012/0155889 | A1 | 6/2012 | Kim |
| 2012/0218101 | A1 | 8/2012 | Ford |
| 2012/0262365 | A1 | 10/2012 | Mallinson |

FOREIGN PATENT DOCUMENTS

| FR | 2584197 | 1/1987 |
|---|---|---|
| WO | WO9949435 A1 | 9/1999 |

OTHER PUBLICATIONS

S. Arai, et al., "Experiment on Hierachical Transmission Scheme for Visible Light Communication Using LED Traffic Light and High-Speed Camera," 2007; pp. 1-5.
G. K. H. Pang, et al., "LED Location Beacon System Based on Processing of Digital Images," IEEE Transactions on Intelligent Transportation Systems, vol. 2.; No. 3.; Sep. 2001; pp. 135-150.

* cited by examiner

*Primary Examiner* — Tri T Ton
(74) *Attorney, Agent, or Firm* — Cantor Colburn LLP

(57) ABSTRACT

A system and method of for performing an action at a device is disclosed. A first signal is sent into a first zone from a first light source, wherein the first signal identifies the first zone. The first signal is received at the device when the device is in the zone. The device determines from the received first signal that the device is in the first zone and performs the action at the device based on the device being in the first zone. A second variable light source may send a second signal into a second zone, wherein the second signal identifies the second zone. Triangulation may be performed to determine a location of the device using the first signal and the second signal. Alternately, a parameter of motion of the device may be determined using the received messages.

7 Claims, 5 Drawing Sheets

OBJECT LOCATION IN THREE DIMENSIONAL SPACE USING LED LIGHTS

BACKGROUND

The present invention relates to determining a location of an object and, in particular, to using light-emitting diodes to send signals to the object to locate the object.

Locating an object in a three-dimensional space is useful in a number of applications. GPS (Global Positioning System), for example, has led to advances in navigation, communications, national defense, etc. GPS systems are limited to a resolution of from about six feet to about nine feet. There are, however, applications that may benefit from locating an object's position at a finer resolution scale, such as a few inches. While there are extensions to GPS that allow a finer granularity, such as differential GPS and inertial navigation system, these extensions add significant cost. Additionally, there are numerous situations in which locating an object in three-dimensional space might be useful but GPS signals are not available.

SUMMARY

According to one embodiment of the present invention, a method of using a device includes sending a first signal into a first zone, wherein the first signal identifies the first zone; receiving the first signal at the device when the device is in the first zone; determining from the received first signal that the device is in the first zone; and performing an action at the device based on the device being in the first zone.

According to another embodiment of the present invention, a system for performing an action includes a first light source configured to transmit a first signal into a first zone, wherein the first signal identifies the first zone; and a device configured to: receive the first signal when the device is in the first zone, determine from the received first signal that the device is in the first zone, and perform the action at the device based on determining that the device is in the first zone.

According to another embodiment of the present invention, a system for locating a device includes a first light source configured to send a first signal into a first zone that identifies the first zone; and a second light source configured to send a second signal into a second zone that identifies the second zone; wherein the device determines that it is within the first zone upon receiving the first signal and determines that it is within the second zone upon receiving the second signal.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
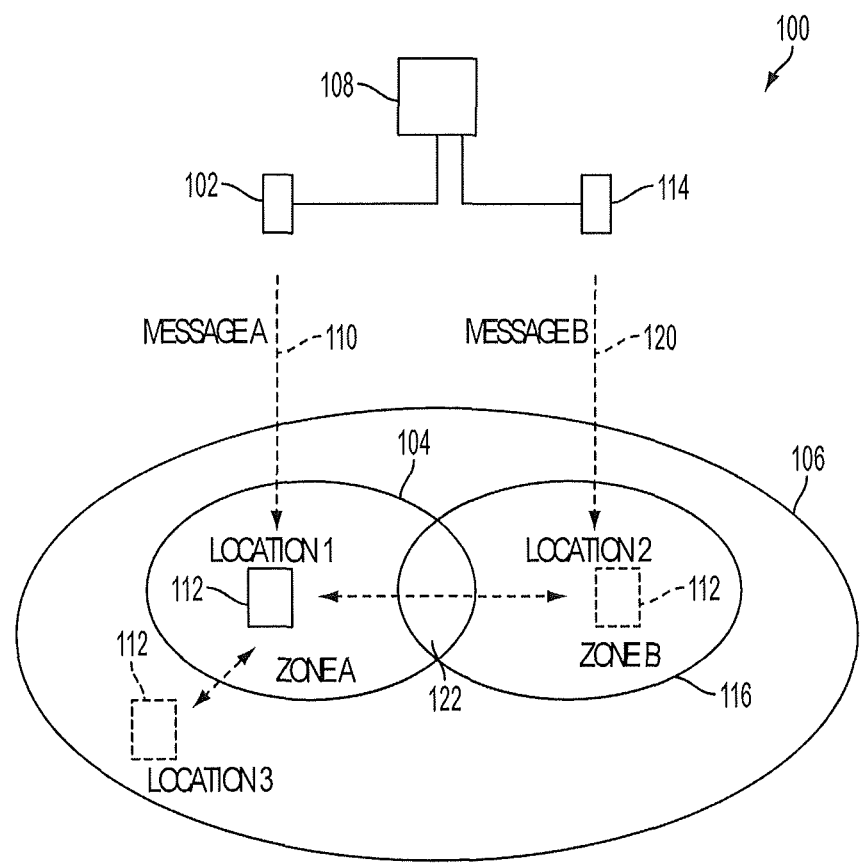
FIG. 1 shows an exemplary system for locating a device according to an exemplary embodiment of the present invention.

FIG. 1 shows an exemplary system 100 for locating a device according to an exemplary embodiment of the present invention. The system 100 includes a first light-emitting diode (LED) 102 that illuminates a first zone ("zone A") 104 within a volume 106. The first LED 102 may be controlled by a controller 108 to vary an intensity of the first LED 102 in order to transmit a signal from the first LED 102, such as a binary signal. In one embodiment, the first LED 102 may be switched between two states, such as between an ON state and an OFF state, to transmit the binary signal. In an exemplary embodiment, the signal includes a message that indicates a spatial volume, such that a device receiving the signal may determine that it is within the spatial volume. In an exemplary embodiment, the rate of data transmission by the first LED 102 may be greater than about 10 Megabits per second (Mbits/sec). Alternatively, the rate of data transmission may be greater than about 100 Mbits/sec or greater than about 1 Gigabits per second (Gbits/sec). At these data transmission rates, switching the first LED 102 between the two states of the binary signal to transmit the binary signal may go undetected by the human eye. Therefore, the first LED 102 may be used for both illumination purposes and for data transmission purposes. While the invention is described with respect to use of LEDs, the invention may be used with any variable light source that may be varied between at least a first state and a second state to transmit a binary signal.

Light from the first LED 102 transmits a binary signal into first zone 104 within volume 106. In various embodiments, the binary signal is an encoded signal ("message A") 110 that identifies zone A 104. A device 112 may be a mobile device that may be moved around within the volume 106, as illustrated in FIG. 1. The exemplary device 112 includes a sensor that is sensitive to the light from LED 102. The device 112 therefore receives "message A" 110 from the LED 102 when it is within zone A 104 (i.e., at location 1). The device 112 may include a processor that is configured to recognize that the device 112 is residing within zone A 104 upon receiving "message A" 110.

A second LED 114 illuminates a second zone ("zone B") 116 and transmits a binary signal ("message B") 120 into a second zone 116. When in zone B 116 (i.e., at location 2), the device 112 may receive "message B" (120) from the second LED 114, which indicates to the device 112 that the device 112 is within zone B 116. For example, message A may be "01011" and message B may be "10111." These messages may be repeated continuously or periodically. In the exemplary embodiment, second LED 114 may be controlled by controller 108 to transmit message B (120) into zone B 116. Alternately, second LED 114 may be controlled by a different controller than controller 108. In various embodiments, first LED 102 and second LED 114 may transmit at the same wavelength and/or at the same transmission rate. Alternately, first LED 102 and second LED 114 may transmit at different wavelengths and/or at different transmission rates. Thus, in an alternate embodiment, message A and message B may be signals have different wavelengths and zone A and zone B may be determined based on the wavelength of the received signal. In the exemplary embodiment, a portion of zone A 104 may overlap a portion of zone B 116. In alternate embodiments, zones may not be overlapping. Device 112 may be able to move in and out of zone A 104 and zone B 116 as well as in and out of volume 106. When the device 112 is in the overlapping region 122 of zone A 104 and zone B 116, the device 112 may receive both message A (110) and message B (120) and therefore determine that it is located in the intersection region 122. When the device 112 is at location 3, it may determine that it is not in either of first zone 104 and second zone 116 because it does not receive either message A (110) or message B (120).

In an exemplary embodiment, controller 108 controls the operation of LEDs 102 and 114. In alternate embodiments, each LED may have its own controller. The controller in these alternate embodiments may be integrated into the LED device. Also, the controller 108 or the integrated controller of the alternate embodiments may operate any of LEDs 102 and 114 to send a programmable message into a selected zone or zones. The programmable message may provide a communication to the device and/or other signals for operation of the device 112.

Figure 2:
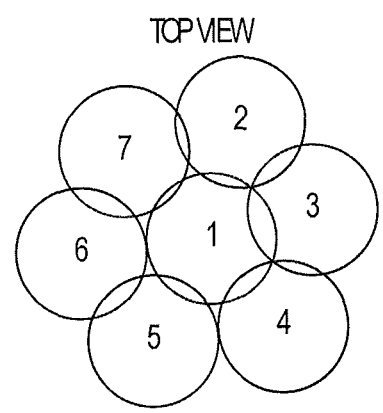
FIG. 2 shows a top view of a plurality of zones in an exemplary embodiment.

FIG. 2 shows a top view of a plurality of zones in an exemplary embodiment. The plurality of zones are arranged so as to effectively cover a selected volume, such as volume 106. The zones may be labeled as shown in FIG. 2 or using any suitable labeling system that provides a system for organizing the volume. For each zone, a corresponding LED may be provided to supply a message that identifies the zone into the zone. An LED for zone 1. for example, sends a specified signal or message into zone 1. When the signal or message is received and decoded by a device in zone 1. the device determines that it is residing in zone 1. In an exemplary embodiment, the plurality of zones may fill a cabin of a car or other transportation vehicle. Thus, the plurality of zones may at some point be in motion relative to an earth frame of reference.

Figure 3:
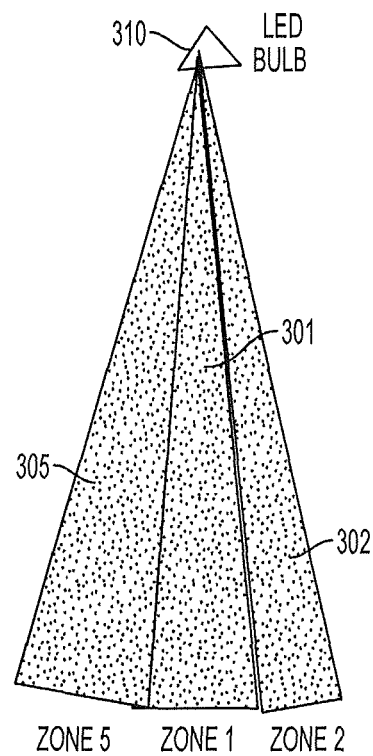
FIG. 3 shows an exemplary LED bulb that includes a plurality of LEDs.

In various aspects, the plurality of LEDs may be separately located at various locations around the volume. When the volume is a cabin of a vehicle, each LED may be located at various locations around the cabin of the vehicle. Alternately, the plurality of LEDs may be assembled at a single location within a single LED bulb 310 or LED light fixture, as shown in FIG. 3. FIG. 3 shows an exemplary LED bulb 310 that includes a plurality of LEDs. Each of the plurality of LEDs is arranged to provide a beacon of light to send a signal for the corresponding zone. For example, three of the plurality of LEDs may be used to supply beacons 301, 302 and 305 for illuminating zones 1, 2 and 5, as shown in FIG. 3. Zones 1, 2 and 5 may be a cross-section of the zones shown in FIG. 2 and are selected for illustrative purposes only.

In various embodiments, each the LED bulb 310 may include a controller that is integrated into the LED bulb 310. While a controller, whether integrated or not, may operate the LED bulb 310 to provide a static message, the controller may also be programmed to operate the LED bulb 310 to send a programmable message into a selected zone or zones to provide communication with a device in the exemplary zones and/or other signals for operation of the device.

Figure 4:
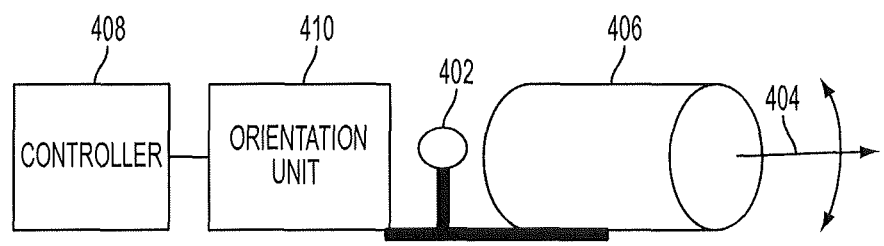
FIG. 4 show a configuration for a light-emitting diode in an exemplary embodiment of the present invention.

FIG. 4 shows a configuration for a light-emitting diode in an exemplary embodiment of the present invention. For a selected LED 402, light may be partially blocked in order to provide a beacon 404 of light from the selected LED 402. The beacon 404 of light demarcates the area of the zone corresponding to the selected LED 402. In various embodiments, the light from the LED 402 may be partially blocked by a shroud 406 proximate the LED 402, thereby providing the corresponding beacon 404 of light. Additionally, beacon 404 may be orientable in space. Exemplary controller 408 may be used to select an orientation of the beacon 404 and then send a signal to an orientation unit 410 that orients the exemplary LED 402 and shroud 406 accordingly. Therefore, the location of the zone corresponding to exemplary LED 402 may be selected or adjusted based on a selected criterion. Alternately, the orientation and shrouding of the LED 402 may be in a fixed position within a housing such as LED bulb 310.

In one embodiment, each of the plurality of light-emitting diodes of the LED bulb 310 may have separate circuits and electrical connectors. The light-emitting diode may include an accompanying shroud and orientation unit that may be built into the LED bulb 310. Alternatively, an LED bulb 310 may have a shroud and orientation unit that is in associated with the LED bulb 310. A plurality of LED bulbs 310 may be used for a selected application.

Figure 5:
FIG. 5 illustrates use of the object-locating system of the present invention in a vehicle.

FIG. 5 illustrates use of the object-locating system of the present invention in a vehicle. An exemplary car cabin includes three LED lights 502, 504 and 506 that send their respective messages into a selected zone. The selected zone may be a driver's seat or a passenger seat, for example. A device 510 is held by the driver in the "driver's seat zone." In the exemplary embodiment, the device 510 may be a cellular phone. The device 510 may receive all three messages from the three LED lights 502, 504 and 506 and thereby triangulate its position to determine that it is in the driver's seat zone. The device 510 may then perform an action based on its being located within the driver's seat zone. In another embodiment, the device 510 may receive a message from only one of the LED lights 502, 504 and 406 in order to determine that it is located within the driver's seat zone and to perform the action. In this embodiment, covering the driver's seat zone with multiple LEDs may therefore be used for redundancy purposes. Additionally, the device 510 may further perform other actions based on determining its location in zones other than the driver's seat zone.

In one example, the cellular phone 510 may disable certain functions such as the ability to make text messages or make phone calls when the cellular phone 510 determines that it is located in the driver's seat zone, and is thus being used by the driver. The cellular phone 510 may then enable these functions upon determining that it is located somewhere other than the driver's seat zone, and is thus being used by a passenger. In another embodiment, the cellular phone 510 may record the zone that it is in while it is in use. Thus, the cellular phone 510 may record whether a phone call or text message is made by the driver or by a passenger. This information may be used to confirm or refute a violation of a local regulations regarding cell phone use while driving. In another embodiment, the location information may be sent to a person receiving the text message or cellular phone call, telling the person on the other end of the call in which zone of the car the phone is being used, thereby giving the person the opportunity to cut the call short. For example, a standard text (i.e., "Message sent by driver") may be appended or prepended to the driver's text message. For a phone call, an audio message may be played for the receiver of the call before the call goes through. Alternately, a recognizable signal or message may be played over the phone conversation at selected intervals to indicate the phone is being used by the driver. In yet another embodiment, the cellular phone 510 may determine that it is being used by the driver and transfer its communication ability to a dashboard communication system, allowing the driver to keep both hands on the driving wheel. In order to determine that the driver is using the cellular phone 510 while the car is in motion or, in other words, to determine a motion or speed of the driver's seat zone relative to an earth reference frame, the cellular phone 510 may be in communication with a speedometer of the car. Alternatively, the cellular phone 510 may be in communication with a GPS tracking system that is either in the cellular phone 510 or in the vehicle in order to determine the speed of the driver's seat zone.

Additionally, information regarding the velocity and transmission state of the vehicle may be used along with the location information of the cellular phone 510 within the vehicle to determine whether the cellular phone 510 becomes enabled. For instance, when the velocity of the car is zero and the car is placed in Park, the cell phone 510 may be enabled, since there is no danger associated with use of the cellular phone 510 in a parked car. However, when the car is in Drive or Reverse and/or the velocity of the car is non-zero, then use of the cellular phone 510 may be disabled.

Figure 6:
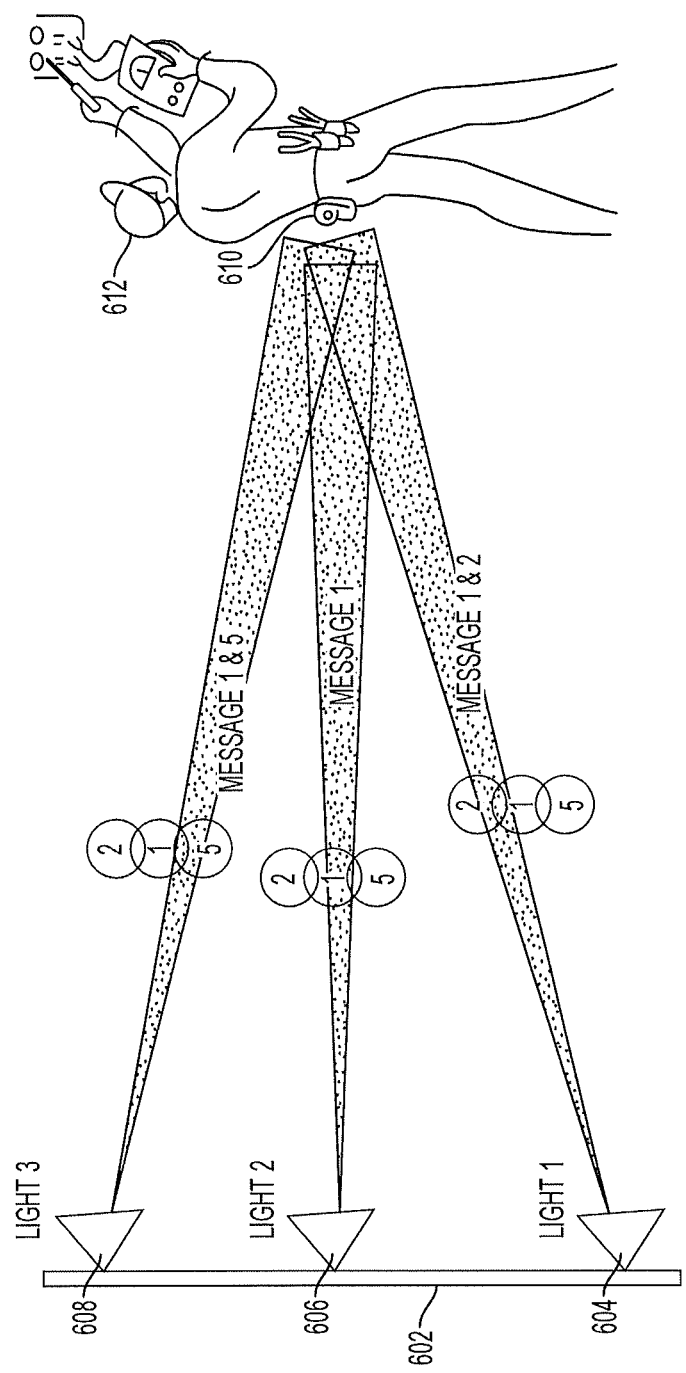
FIG. 6 shows another embodiment of the present invention for use as a safety device.

FIG. 6 shows another embodiment of the present invention for use as a safety device. A member or safety stick 602 may be equipped with a plurality of LED bulbs 604, 606 and 608 spaced apart along the member 602. In the exemplary embodiment, each of the LED bulbs 604, 606 and 608 may include a plurality of LEDs that are configured to provide zones such as the zones shown in FIG. 2. For illustrative purposes only, zones 2, 1 and 5 for each of the LED bulbs 604, 606 and 608 are shown in FIG. 6. The member 602 may be placed at any suitable location and oriented so that the zones provided by the LED bulbs 604, 606 and 608 illuminate a device 610 in a volume of interest within which a worker 612 may be located.

In the exemplary embodiment, the worker 612 may wear the device 610 on his or her body. Thus, the location of the worker may be determined at any time. Movement of the worker moves the device 610 into and out of the various zones of LED bulbs 604, 606 and 608. For example, the device 610 as shown in FIG. 6 is within zones 1 and 2 of LED bulb 1 (604). The device 610 is also in zone 1 of LED bulb 2 (606) and zones 1 and 5 of LED 3 (608). Thus, the device 610 may be able to triangulate its position in space with respect to the member 602. At the same time the device 610 may be able to record times at which it determines its location. A difference between locations over a selected time may be used to determine a velocity of the device 610. Thus, when the device determines its location within a first zone at a first time and a location within a second zone at a second time, the device 610 may determine a velocity of motion between the zones. The device may store signals and the times at which they are received over a selected time duration and determine velocity and/or acceleration of the device 610 during the selected time duration from the stored signals and times.

Figure 7:
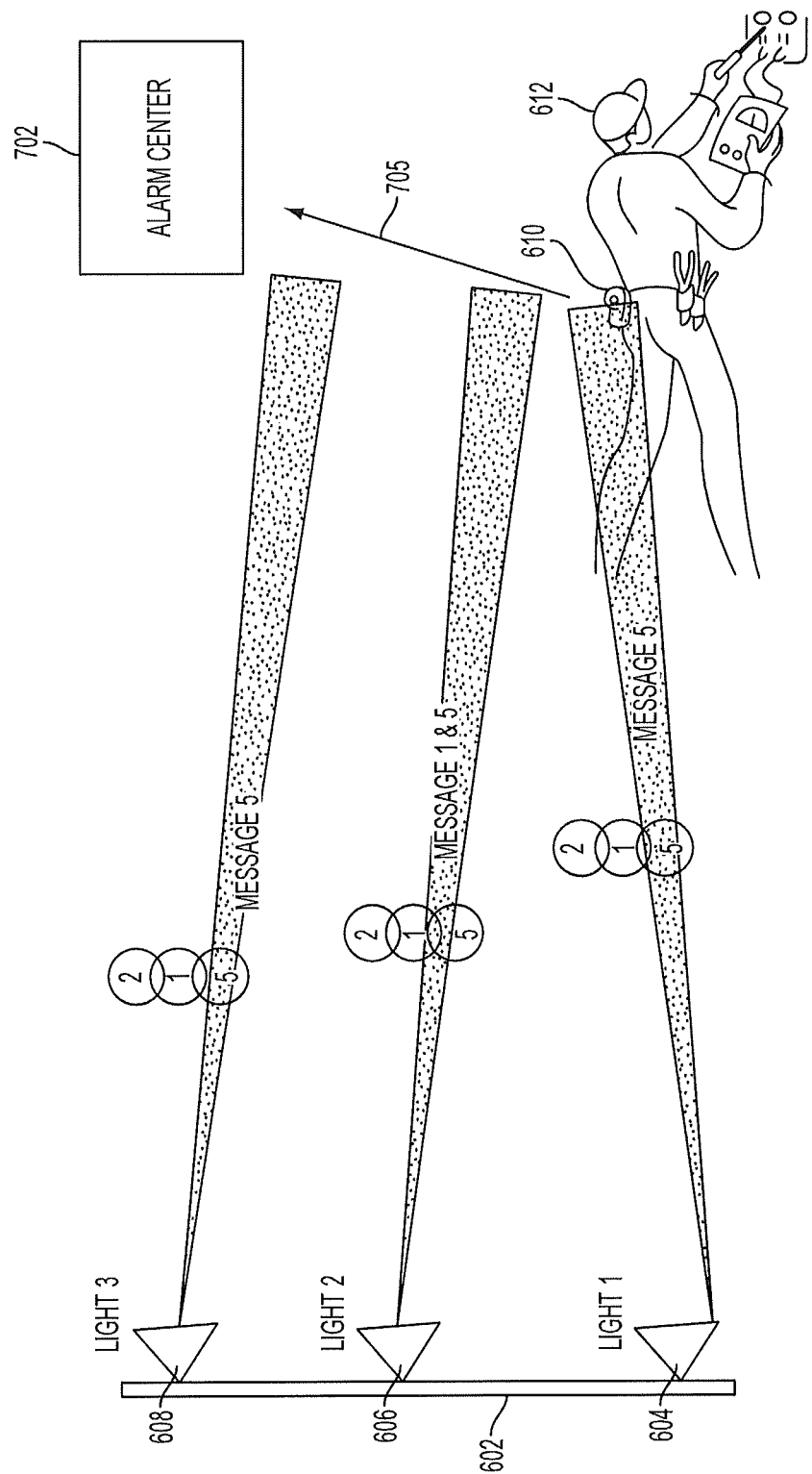
FIG. 7 shows the safety device of FIG. 6 in an emergency situation.

FIG. 7 shows the safety device of FIG. 6 in an emergency situation. The worker has suffered an injury or mishap and has fallen as a result. In this case, the device 610 is only in zone 5 of the LED bulb 1 (604). The zones provided by LED bulb 2 and LED bulb 3 that are closest to the device 610 are show for illustrative purposes. The device 610 may determine its location and the speed and/or acceleration with which it has moved from its original location in FIG. 6 to its current location in FIG. 7. For example, when the worker falls, the device 610 may pass through a plurality of zones over a short time. From the determined zone locations and signal reception times, the device 610 may determine its speed and/or acceleration through the zones. When the determined speed or acceleration is above a selected threshold, an emergency situation may exist, such as the worker 612 having fallen. Thus, when the determined speed or acceleration is above a selected threshold, the device 610 may therefore send an alarm signal 705 to an alarm center 702 or other appropriate location to call for help. Speed or acceleration in a horizontal direction as well as a vertical direction may be determined.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A system for performing an action, comprising:
a first light source of a vehicle configured to transmit a first signal into a first zone of a cabin of the vehicle, wherein the first signal identifies the first zone;
a second variable light source configured to send a second signal into a second zone of the cabin that intersects at least a part of the first zone, wherein the second signal identifies the second zone; and
a device movable within the cabin configured to:
receive the first signal and the second signal when the device is in the intersection of the first zone and the second zone,
determine from the received first signal and the received second signal that the device is in the intersection of the first zone and the second zone, and
perform the action at the device based on determining that the device is in the intersection of the first zone and the second zone.

2. The system of claim 1, wherein the vehicle is movable relative to an earth reference frame and the device is further configured to select the action to perform using the relative motion of the vehicle with respect to the earth reference frame and a location of the device in the cabin relative to the first zone.

3. The system of claim 1, wherein the first zone is selected from a plurality of zones of the cabin and the first light source is selected from a plurality of light sources that correspond to the plurality of zones and are configured to send signals into the plurality of zones that identify the plurality of zones.

4. The system of claim 3, wherein the plurality of light sources further comprises at least one of: a plurality of light-emitting diodes placed in separate locations of the vehicle; and a plurality of light-emitting diodes contained in a bulb.

5. The system of claim 1, wherein the first light source further comprises a shroud configured to demarcate the first zone.

6. The system of claim 1, further comprising a controller configured to orient the first light source to select a location of the first zone.

7. The system of claim 1, wherein the action includes at least one of: deactivating the device; activating the device; determining a location of the device; transferring an operation of the device to a secondary device; sending an emergency signal; recording a location of use of the device; transmitting a location of use of the device; determining a parameter of motion of the device; and sending an alarm signal based on determined speed of the device.

* * * * *